United States Patent
Kawada et al.

(10) Patent No.: US 11,594,720 B2
(45) Date of Patent: Feb. 28, 2023

(54) POSITIVE ELECTRODE FOR SECONDARY BATTERY, SECONDARY BATTERY, AND METHOD FOR PRODUCING POSITIVE ELECTRODE FOR SECONDARY BATTERY

(71) Applicant: Panasonic Intellectual Property Management Co., Ltd., Osaka (JP)

(72) Inventors: Hiroshi Kawada, Hyogo (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 229 days.

(21) Appl. No.: 16/968,950

(22) PCT Filed: Jan. 7, 2019

(86) PCT No.: PCT/JP2019/000079
§ 371 (c)(1),
(2) Date: Aug. 11, 2020

(87) PCT Pub. No.: WO2019/159563
PCT Pub. Date: Aug. 22, 2019

(65) Prior Publication Data
US 2021/0057722 A1    Feb. 25, 2021

(30) Foreign Application Priority Data
Feb. 19, 2018   (JP) .............................. JP2018-027310

(51) Int. Cl.
*H01M 4/1391*   (2010.01)
*H01M 4/62*   (2006.01)
(Continued)

(52) U.S. Cl.
CPC ......... *H01M 4/1391* (2013.01); *H01M 4/131* (2013.01); *H01M 4/62* (2013.01)

(58) Field of Classification Search
None
See application file for complete search history.

(56) References Cited

U.S. PATENT DOCUMENTS 10,559,810 B2 *   2/2020   Yanagihara ............ C01G 53/42
2016/0351973 A1   12/2016   Albano et al.
(Continued)

FOREIGN PATENT DOCUMENTS

| CN | 103022415 A | 4/2013 |
| CN | 107516731 A | 12/2017 |

(Continued)

OTHER PUBLICATIONS

International Search Report dated Apr. 9, 2019, issued in counterpart Application No. PCT/JP2018/000079. (2 pages).
(Continued)

*Primary Examiner* — Tracy M Dove
(74) *Attorney, Agent, or Firm* — WHDA, LLP (57) ABSTRACT

A positive electrode for a secondary battery includes a positive electrode current collector and a positive electrode active material layer that contains a positive electrode active material particle and that is disposed on the surface of the positive electrode current collector. The positive electrode active material particle includes a positive electrode active material particle, a first coating that contains oxide X of metal element $M^1$ and that is attached to the surface of the positive electrode active material particle, and a second coating having lithium-ion permeability that is attached to the surface of the first coating. The second coating contains oxide Y represented by $Li_xM^2O_y$ ($0.5 \le x < 4$, $1 \le y < 6$), $M^2$ being at least one selected from a group consisting of B, Al, Si, P, S, Ti, V, Zr, Nb, Ta, and La.

12 Claims, 1 Drawing Sheet

(51) Int. Cl.
    *H01M 4/04*      (2006.01)
    *H01M 4/136*     (2010.01)
    *H01M 4/131*     (2010.01)

(56) References Cited

U.S. PATENT DOCUMENTS

| 2017/0207444 | A1 | 7/2017  | Yanagihara et al. |
| 2017/0207456 | A1 | 7/2017  | Liu et al. |
| 2018/0254477 | A1 | 9/2018  | Horikawa et al. |
| 2018/0294477 | A1 | 10/2018 | Shin et al. |
| 2018/0323435 | A1 | 11/2018 | Lim et al. |

FOREIGN PATENT DOCUMENTS

| CN | 107636866    A | 1/2018 |
| JP | 2003-173770  A | 6/2003 |
| JP | 2016-33902   A | 3/2016 |
| JP | 2018-147726  A | 9/2018 |

OTHER PUBLICATIONS

International Search Report dated Apr. 9, 2019, issued in counterpart Application No. PCT/JP2019/000079. (2 pages).
English Translation of Chinese Search Report dated Sep. 8, 2022, issued in counterpart CN application No. 201980006662.0. (2 pages).

* cited by examiner

POSITIVE ELECTRODE FOR SECONDARY BATTERY, SECONDARY BATTERY, AND METHOD FOR PRODUCING POSITIVE ELECTRODE FOR SECONDARY BATTERY

TECHNICAL FIELD

The present disclosure relates to improvement of a positive electrode for a secondary battery.

BACKGROUND ART

On the surface of positive and negative electrode active materials of secondary batteries typified by lithium ion batteries, an electrolyte containing a solvent and a lithium salt partially reacts irreversibly during charging/discharging.

To suppress side reactions in batteries, a method for uniformly covering positive and negative electrodes containing active materials by using a protective layer is proposed. PTL 1 discloses a method for covering a positive electrode with a lithium-ion conductive glass by a sol-gel method to suppress side reactions particularly on the positive-electrode side.

CITATION LIST

Patent Literature

PTL 1: Japanese Published Unexamined Patent Application No. 2003-173770

SUMMARY OF INVENTION

In the method of PTL 1 for covering with a lithium-ion conductive glass, a positive electrode active material formed of a high-crystalline transition metal oxide is covered with a low-crystalline glass material, and thus, the crystallinity of the surface of the active material decreases. As a result, the transfer of lithium ions is prevented, thereby increasing the internal resistance of the battery.

The positive electrode for a secondary battery according to the present disclosure includes a positive electrode current collector and a positive electrode active material layer that contains a positive electrode active material and that is disposed on the surface of the positive electrode current collector.

The positive electrode material includes a positive electrode active material particle, a first coating that contains oxide X of metal element $M^1$ and that is attached to the surface of the positive electrode active material particle, and a second coating having lithium-ion permeability that is attached to the surface of the first coating. The second coating contains oxide Y represented by $Li_xM^2O_y$ ($0.5 \leq x < 4$, $1 \leq y < 6$), $M^2$ being at least one selected from a group consisting of B, Al, Si, P, S, Ti, V, Zr, Nb, Ta, and La.

A secondary battery according to the present disclosure includes the positive electrode, a negative electrode, and an electrolyte having lithium-ion conductivity.

A method for producing a positive electrode for a secondary battery, according to an embodiment of the present disclosure, includes a step of preparing a positive electrode active material particle, a step of attaching oxide X of metal element $M^1$ to the surface of the positive electrode active material particle to form a first coating, a step of disposing a positive electrode active material layer containing the positive electrode active material particle on a positive electrode current collector, and a step of covering at least a portion of the surface of the first coating by using a second coating having lithium-ion permeability. The second coating is formed by exposing the positive electrode active material layer or the positive electrode active material particle having the first coating formed thereon to an atmosphere containing a material of the second coating.

The positive electrode for a secondary battery according to the present disclosure realizes a secondary battery in which an increase in the internal resistance is suppressed.

DESCRIPTION OF EMBODIMENTS

The positive electrode for a secondary battery according to an embodiment of the present disclosure includes a positive electrode current collector and a positive electrode active material layer that contains a positive electrode material and that is disposed on the surface of the positive electrode current collector. The positive electrode material includes a positive electrode active material particle, a first coating that contains oxide X of metal element $M^1$ and that is attached to the surface of the positive electrode active material particle, and a second coating having lithium-ion permeability that is attached to the surface of the first coating. The second coating contains oxide Y represented by $Li_xM^2O_y$ ($0.5 \leq x < 4$, $1 \leq y < 6$), $M^2$ being at least one selected from a group consisting of B, Al, Si, P, S, Ti, V, Zr, Nb, Ta, and La.

At least a portion of the surface of the positive electrode active material particle is covered with the first coating. The first coating contributes to stabilization of crystallinity of the positive electrode active material surface. The crystallinity of the positive electrode active material surface is highly maintained, thereby obtaining a low-resistance and high-power secondary battery.

It is not necessary to form the second coating having lithium-ion permeability on all the positive electrode active material particles. The first coating is preferably disposed between the positive electrode active material particle and the second coating. Hereinafter, the positive electrode active material particle covered with the first coating and the second coating is optionally referred to as "double-coated positive electrode active material particle".

The first coating interposed between the positive electrode active material particle and the second coating solves a problem that occurs when the positive electrode active material particle is covered with only the second coating, thereby obtaining a secondary battery in which the side reaction is sufficiently suppressed.

The following exemplary two methods may be performed to attach the first coating and the second coating to the positive electrode active material particle. One or both of the following (1) and (2) may be performed.

(1) The first coating is attached to the surface of the positive electrode active material particle, and thereafter, the second coating is further attached to the active material particle. The obtained double-coated positive electrode active material particles are used to form a positive electrode active material layer. The second coating is also attached to the surface of the first coating.

(2) Positive electrode active material particles having a surface to which the first coating is attached are used to form a positive electrode active material layer. After the positive electrode active material layer is formed, an exposed surface of the positive electrode active material layer that is to be in contact with an electrolyte is covered with the second coating.

When (2) is performed, the second coating having lithium-ion permeability covers at least a portion of the surface of the positive electrode active material layer. Here, the surface of the positive electrode active material layer is not limited to a surface of the positive electrode active material layer that faces the negative electrode with the separator interposed between such a surface and the negative electrode. The surface of the positive electrode active material layer includes the inner wall of each pore in the porous positive electrode active material layer. Preferably, the second coating, which covers the surface of the positive electrode active material layer, enters the inner portion of each pore in the positive electrode active material layer and covers the inner wall.

When the second coating is formed after the positive electrode active material layer is formed, the second coating can partially cover the surface of the positive electrode current collector. When observed microscopically, the surface of the positive electrode current collector is not completely covered with the positive electrode active material or a binder, and minute portions of the surface are exposed. Furthermore, a cut end surface or a lead attaching portion of the positive electrode current collector may be exposed. Such exposed portions of the surface are covered with the second coating, and thus, decomposition of the electrolyte that starts at the surface of the positive electrode current collector is suppressed.

The positive electrode active material layer may be a mixture (mixture agent) containing materials, such as the positive electrode active material and a binder (binding agent). When (2) is performed, the second coating, which covers the surface of the positive electrode active material layer, is formed on the surface of the positive electrode active material layer after the positive electrode active material layer is formed by applying a slurry in which positive electrode active material particles and a binder are mixed together to the positive electrode current collector. When (2) is performed, a region in which the second coating is not disposed may be present on the adhesion interface between the positive electrode active material particle and the binder. This differs from (1), in which the second coating is formed on the positive electrode active material particle beforehand. In the same manner, a region in which the second coating is not disposed may be present on the adhesion interface between the positive electrode active material particle and the positive electrode current collector. Furthermore, a region in which the second coating is not disposed may be present on the adhesion interface between the adjacent positive electrode active material particles.

Furthermore, when the second coating is formed after the positive electrode active material layer is formed, the second coating can partially cover the surface of the binder. When the positive electrode active material layer contains an electrically conductive agent, the second coating can partially cover the surface of the electrically conductive agent. This suppresses decomposition of the electrolyte that starts at the binder or the electrically conductive agent.

To cover the surface of the binder with the second coating, it is necessary to generate the second coating at a temperature lower than the upper-temperature limit of the binder. The upper-temperature limits of the binders differ depending on the type of binder. It is estimated that the temperature for generating the second coating is preferably 200° C. or lower and more preferably 120° C. or lower.

The first coating contains oxide X of metal element $M^1$. The metal element $M^1$ preferably contains at least one selected from W, Mg, and Ti. In the positive electrode active material particle covered with the first coating and the second coating (double-coated positive electrode active material particle), it is preferable that the metal element $M^1$ have a concentration distribution in a depth direction such that the metal element $M^1$ localizes close to the first coating more than in the inner portion of the positive electrode active material particle.

Typically, when the oxide X of a metal element, such as W, Mg, or Ti, is added to the positive electrode material, the metal element $M^1$ in the oxide X needs to be solid-dissolved in the transition metal oxide contained in the positive electrode material, to prevent elution of the metal element. However, in the embodiment of the present disclosure, the second coating exhibits the effect of suppressing the elution of the metal element $M^1$, and thus, the metal element $M^1$ does not need to be solid-dissolved. In the double-coated positive electrode active material particle, a small amount of metal element $M^1$ in the first coating may be dispersed inside the positive electrode active material particle. In such a case, the concentration of the metal element $M^1$ in the positive electrode active material particle is far lower than the concentration of the metal element $M^1$ in the first coating.

When the metal element $M^1$ differs from the element $M^2$ in the oxide Y, the number of the metal elements $M^1$ contained in the entirety of the positive electrode active material particle, the first coating, and the second coating (i.e., the entirety of the double-coated positive electrode active material particle) is denoted as $N_x$. In the same manner, the number of the elements $M^2$ contained in the entirety of the double-coated positive electrode active material particle is denoted as $N_Y$. In the double-coated positive electrode active material particle, the element $M^2$ has a concentration distribution in a depth direction such that the element $M^2$ mainly localizes in the second coating, which is the outermost layer. In this case, the element $M^2$ mainly localizes in the second coating, and the proportion of the amount of element $M^2$ that has spread into a portion interior to the first coating is low. Thus, $N_Y$ almost equals the number of the elements $M^2$ in the second coating. On the other hand, regarding $N_X$, when the metal element $M^1$ is solid-dissolved in the positive electrode active material particle, it is necessary to consider the metal element $M^1$ that has been solid-dissolved in the positive electrode active material particle and the metal element $M^1$ in the first coating. If the metal element $M^1$ is solid-dissolved in the positive electrode active material particle such that the concentration thereof is almost the same as the concentration of the metal element $M^1$ in the first coating, $N_X$ becomes considerably larger than $N_Y$ since the volume ratio of the first coating and the second coating relative to the double-coated positive electrode active material particle is very low. Thus, $N_X/N_Y$ may be an extremely large value (typically 100 or higher).

However, $N_X/N_Y$ can be, for example, 5 or less by preventing the metal element $M^1$ from being solid-dissolved in the positive electrode material and by localizing the metal element $M^1$ in the first coating.

In the double-coated positive electrode active material particle, the boundary between the first coating and the second coating may be unclear. However, the element $M^2$ has a concentration distribution such that the concentration thereof is highest at a position close to the surface of the double-coated positive electrode active material particle. On the other hand, the metal element $M^1$ has a concentration distribution such that the concentration thereof is highest at a position deeper than the position at which the concentration of the element $M^2$ peaks. In such a way, when the metal element $M^1$ and the element $M^2$ have a different concentration distribution in the depth direction and the metal element $M^1$ localizes closer than the element $M^2$ to the surface layer, it is determined that the first coating and the second coating are being formed.

The concentration distribution of the metal element $M^1$ and the element $M^2$ in the depth direction is measured by X-ray photoelectron spectroscopy (XPS) while the surface of the positive electrode active material particles is being etched. From the concentration (atomic %) of the metal element $M^1$ and the element $M^2$ measured by XPS, $N_x/N_y$, the ratio of the number $N_x$ of the metal elements $M^1$ to the number $N_y$ of the elements $M^2$ is determined.

The element $M^2$ contained in the oxide Y is preferably at least one selected from a group consisting of B, Al, Si, P, S, Ti, V, Zr, Nb, Ta, and La. At least one selected from a group consisting of P, Si, and B is more preferable since the material thereof is obtained at a low cost. The element $M^2$ still more preferably contains at least P.

The oxide Y represented by the composition formula $Li_xM^2O_y$ contains an O—Li bonding having ion binding properties. Lithium-ion permeability is exhibited due to lithium-ion hopping via O sites. From the viewpoint of stability, the oxide Y is preferably a polyoxometalate compound. The ranges of x and y are preferably, for example, $0.5 \leq x < 4$ and $1 \leq y < 6$.

The polyoxometalate compound may be one or any combination of compounds, such as $Li_3PO_4$, $Li_4SiO_4$, $Li_2Si_2OS$, $Li_2SiO_3$, $Li_3BO_3$, $Li_3VO_4$, $Li_3NbO_4$, $LiZr_2(PO_4)$, $LiTaO_3$, $Li_4Ti_5O_{12}$, $Li_7La_3Zr_2O_{12}$, $Li_5La_3Ta_2O_{12}$, $Li_{0.35}La_{0.55}TiO_3$, $Li_9SiAlO_8$, and $Li_{1.3}Al_{0.3}Ti_{1.7}(PO_4)_3$. Among such compounds, from the viewpoint of excellent lithium-ion permeability, at least one selected from a group consisting of $Li_3PO_4$, $Li_4SiO_4$, $Li_2Si_2OS$, $Li_2SiO_3$, $Li_3BO_3$, $Li_3VO_4$, and $Li_3NbO_4$ is preferably used, and at least $Li_3PO_4$ is more preferably contained.

A lithium silicate, such as $Li_4SiO_4$, $Li_2Si_2OS$, or $Li_2SiO_3$, is compatible with a silicon-containing alloy-based negative electrode active material (e.g., silicon oxide or silicon alloy). Among such compounds, $Li_4SiO_4$ is preferable since $Li_4SiO_4$ is unlikely to cause a side reaction that generates gas and is obtained at a relatively low cost. It is presumed that $Li_4SiO_4$, which contains a large amount of lithium, is unlikely to cause a side reaction that incorporates lithium ions. At least $Li_4SiO_4$ is preferably contained as the polyoxometalate compound.

Regarding such a polyoxometalate compound, it is not necessary that the proportion of lithium and oxygen is identical to the stoichiometric proportion of lithium and oxygen. When the proportion of oxygen in the oxide Y is lower than the stoichiometric proportion thereof, the lithium-ion permeability is likely to be exhibited since an oxygen defect is present. Specifically, when the oxide Y is a lithium phosphate, $Li_xPO_y$ ($1 \leq x < 3$, $3 \leq y < 4$) is more preferable. When the oxide Y is a lithium silicate, $Li_xSiO_y$ ($2 \leq x < 4$, $3 \leq y < 4$) is more preferable.

The positive electrode active material is preferably a lithium transition metal oxide. Among lithium transition metal oxides, a lithium nickel composite oxide represented by the composition formula $Li_aNi_bM^3_{1-b}O_2$ ($M^3$ is at least one selected from a group consisting of Mn, Co, and Al, $0 < a \leq 1.2$, $0.8 \leq b \leq 1$) is preferable to increase capacity.

The first coating can be formed by, for example, impregnating the positive electrode active material particles with an aqueous solution containing ions of the metal element $M^1$ and performing drying.

The second coating can be formed by, for example, atomic layer deposition (ALD). In ALD, the material gas of the oxide Y is supplied to a reaction chamber to form a film of the oxide Y. When the second coating has a thickness of about 0.5 nm or more, an effect of suppressing a side reaction can be exhibited.

When the oxide Y film is formed by ALD, the second coating may contain nitrogen atoms as impurities since lithium-ion supplying source contains nitrogen atoms. Such nitrogen introduced into the second coating does not give an adverse effect on battery characteristics. Nitrogen in the oxide Y increases the lithium conductivity. Thus, if the second coating becomes thicker, lithium-ion permeability can be maintained and battery characteristics are unlikely to decrease.

Hereinafter, an exemplary sheet-shape positive electrode included in a wound-type electrode group or a stacked-type electrode group will be further described.

(Positive Electrode)

A sheet-shape positive electrode includes a sheet-shape positive electrode current collector and a positive electrode active material layer disposed on the surface of the positive electrode current collector. The positive electrode active material layer may be formed on one surface or both surfaces of the positive electrode current collector.

(Positive Electrode Current Collector)

Examples of the positive electrode current collector include metal foils and metal sheets. The material of the positive electrode current collector may be stainless steel, aluminum, aluminum alloy, or titanium. The thickness of the positive electrode current collector may be selected from the range of, for example, 3 to 50 μm.

(Positive Electrode Active Material Layer)

The case in which the positive electrode active material layer is a mixture (mixture agent) containing positive electrode active material particles will be described. The positive electrode active material layer contains positive electrode active material particles (positive electrode material) and a binder as the essential components and may optionally contain an electrically conductive agent. The amount of binder in the positive electrode active material layer relative to 100 parts by mass of the positive electrode active material is preferably 0.1 to 20 parts by mass and more preferably 1 to 5 parts by mass. The positive electrode active material layer may have a thickness of 10 to 100 μm.

A lithium transition metal composite oxide is preferably used for the positive electrode active material particles (positive electrode material). Examples of the transition metal element include Sc, Y, Mn, Fe, Co, Ni, Cu, and Cr. Among such elements, Mn, Co, and Ni are preferable, and Ni is particularly preferable. The lithium transition metal oxide is more preferably a lithium nickel composite oxide containing Li, Ni, and another metal.

The lithium nickel composite oxide may be $Li_aNi_bM^3_{1-b}O_2$ ($M^3$ is at least one selected from a group consisting of Mn, Co, and Al, $0 < a \leq 1.2$, $0.3 \leq b \leq 1$). In particular, to increase capacity, $0.8 \leq b \leq 1$ is preferably satisfied. Furthermore, to stabilize the crystalline structure, $Li_aNi_bCo_cAl_dO_2$ ($0 < a \leq 1.2$, $0.85 \leq b < 1$, $0 < c < 0.15$, $0 < d \leq 0.1$, $b+c+d=1$), which contains Co and Al as $M^3$, is still more preferable.

Specific examples of the lithium nickel composite oxide include lithium-nickel-cobalt-manganese composite oxides (e.g., $LiNi_{0.5}Co_{0.2}Mn_{0.3}O_2$, $LiNi_{1/3}Co_{1/3}Mn_{1/3}O_2$, $LiNi_{0.4}Co_{0.2}Mn_{0.4}O_2$) lithium-nickel-manganese composite oxides (e.g., $LiNi_{0.5}Mn_{0.5}O_2$), lithium-nickel-cobalt composite oxides (e.g., $LiNi_{0.8}Co_{0.2}O_2$), and lithium-nickel-cobalt-aluminum composite oxides ($LiNi_{0.8}Co_{0.15}Al_{0.05}O_2$, $LiNi_{0.8}Co_{0.18}Al_{0.02}O_2$, $LiNi_{0.88}Co_{0.09}Al_{0.03}O_2$).

The positive electrode active material particles may be primary particles or secondary particles that are aggregations of particles.

In the present embodiment, the surface of the positive electrode active material particle is covered with the above-described first coating. To decrease stress generated due to expansion and contraction of the positive electrode material during charging/discharging and to maintain high crystallinity of the surface of the positive electrode material, the first coating preferably has a thickness of 0.1 μm or more and more preferably 0.03 μm or more. On the other hand, not to prevent transfer of the lithium ions during charging/discharging, the first coating preferably has a thickness of 2 μm or less and more preferably 1 μm or less.

(Second Coating Having Lithium-Ion Permeability)

The second coating may have any thickness, provided that the second coating suppresses the contact between the first coating and the electrolyte. The second coating desirably forms a uniform layer that covers the surface of the first coating, with a necessary and sufficient amount. The second coating desirably has a thickness smaller than the average particle diameter of the positive electrode active material particles and preferably has a thickness of, for example, 0.1 μm (100 nm) or less and more preferably 0.03 μm (30 nm) or less. If the second coating has excessively small thickness, for example, the transfer of carriers (electrons or electron holes) due to the tunneling effect progresses, and oxidative decomposition of the electrolyte may progress.

From the viewpoint of smooth transfer of lithium ions, the total thickness of the first coating and the second coating is preferably 0.5 nm or more.

The second coating may have lithium-ion permeability to an extent to enable lithium ions to enter and exit the positive electrode active material particle. The second coating may be a material having a lithium-ion conductivity of, for example, $1.0 \times 10^{-10}$ S/cm or more and is preferably a material having a lithium ion conductivity of $1.0 \times 10^{-8}$ S/cm or more. On the other hand, to suppress oxidative decomposition of the electrolyte as much as possible, the second coating desirably has a low electrical conductivity. The electrical conductivity is desirably less than $1.0 \times 10^{-2}$ S/cm.

To make the positive electrode active material layer contain a larger amount of positive electrode active material, the average particle diameter (D50) of the positive electrode active material particles is desirably sufficiently small compared with the thickness of the positive electrode active material layer. The average particle diameter (D50) of the positive electrode active material particles is preferably, for example, 5 to 30 μm and more preferably 10 to 25 μm. The term "average particle diameter" (D50) refers to a median diameter at which the cumulative volume is 50% in the volume based particle size distribution. The average particle diameter is measured by using a laser diffraction/scattering particle size distribution analyzer.

Examples of the binder (binding agent) include fluorine resins, such as polyvinylidene fluoride (PVdF), polytetrafluoroethylene (PTFE), and tetrafluoroethylene-hexafluoropropylene copolymers (HFP); acrylic resins, such as polymethyl acrylate and ethylene-methyl methacrylate copolymers; rubber materials, such as styrene-butadiene rubber (SBR) and acrylic rubber, and water-soluble polymers, such as carboxymethyl cellulose (CMC) and polyvinylpyrrolidone.

The electrically conductive material is preferably carbon black, such as acetylene black or KETJENBLACK.

The positive electrode active material layer can be formed by mixing, for example, positive electrode active material particles and a binder with a dispersion medium to prepare a positive electrode slurry, applying the positive electrode slurry to the surface of a positive electrode current collector, performing drying, and thereafter performing rolling. The dispersion medium may be water, an alcohol, such as ethanol, an ether, such as tetrahydrofuran, or N-methyl-2-pyrrolidone (NMP).

To reliably obtain the capacity of the positive electrode, it is desirable that the proportion of the second coating in the positive electrode is low as much as possible. To enable lithium ions to readily enter and exit the positive electrode active material particle, the second coating is desirably formed so as to be uniform and thin as much as possible. Considering the above, the amount of second coating in the positive electrode relative to 100 parts by mass of the positive electrode active material layer is preferably 0.01 to 10 parts by mass and more preferably 0.05 to 5 parts by mass.

Next, a method for producing a positive electrode for a secondary battery, according to the embodiment of the present disclosure, includes step (i) of preparing a positive electrode active material particle, step (ii) of attaching oxide X of metal element $M^1$ to the surface of the positive electrode active material particle to form a first coating, step (iii) of disposing a positive electrode active material layer containing the positive electrode active material particle on a positive electrode current collector, and step (iv) of covering at least a portion of the surface of the first coating by using a second coating having lithium-ion permeability.

In the step (ii), a deposition method can be used. In such a deposition method, for example, the positive electrode active material particles are immersed in a solution in which the metal element $M^1$ ions are dissolved, and thereafter, the oxide X of the metal element $M^1$ is deposited on the surface of the positive electrode active material particles.

In the step (iv), the second coating is formed by exposing the positive electrode active material layer or the positive electrode active material particle having the first coating formed thereon to an atmosphere containing the material of the second coating. Exposing the positive electrode active material layer to an atmosphere containing the material of the second coating refers to covering the surface of the positive electrode active material layer by using the second coating after the positive electrode active material layer is formed, as described above. Exposing the positive electrode active material particles to an atmosphere containing the material of the second coating refers to covering the surface of the first coating of each positive electrode active material particle by using the second coating before the positive electrode active material layer is formed, as described above. The second coating is preferably formed by a liquid-phase method or a gas-phase method.

The liquid-phase method is preferably, for example, a deposition method or a sol-gel method. Such a deposition method may be a method including immersing the positive electrode active material particles in a solution in which the material of the second coating is dissolved and thereafter, depositing the constituent material of the second coating on the surface of the first coating. The sol-gel method may be a method including immersing the material of the positive electrode material in a liquid containing the material of the second coating and thereafter, precipitating intermediate particles of the second coating on the surface of the first coating to make them gel.

Examples of the gas-phase method include physical vapor deposition (PVD), chemical vapor deposition (CVD), and atomic layer deposition (ALD). PVD and CVD are typically performed at a temperature higher than 200° C. On the other hand, when ALD is used, the second coating can be formed in an atmosphere at a temperature higher than 200° C., at 200° C. or lower, or furthermore, at 120° C. or lower. In particular, when the surface of the positive electrode active material layer is covered with the second coating, ALD is preferably used since the second coating needs to be formed at a temperature lower than the upper-temperature limit of the binder.

In ALD, the material of the second coating is an organic compound having high vapor pressure. Such a material is vapored, and thus, the molecular material and the surface of the first coating can react with each other. The molecular material readily reaches the pores in the positive electrode active material layer and readily forms the uniform second coating on the inner wall of the pores.

In ALD, the second coating, which covers the surface of the positive electrode active material particles or the surface of the positive electrode active material layer, can be formed by, for example, the following procedure.

When the oxide Y film is formed by ALD, first, the gaseous first material is introduced into a reaction chamber in which the positive electrode active material particles or the positive electrode active material layer is placed. This exposes the first coating of the positive electrode active material particle or the first coating exposed in the positive electrode active material layer to an atmosphere containing the first material. Thereafter, when the surface of the first coating is covered with a monolayer of the first material, automatic stopping mechanism of an organic group in the first material functions, and thus, the first material is not adsorbed on the surface of the first coating anymore. The extra amount of first material is purged from the reaction chamber by using, for example, an inert gas.

Next, the gaseous second material is introduced into the reaction chamber. This exposes the first coating to an atmosphere containing the second material. When the reaction between the monolayer of the first material and the second material finishes, the second material is not adsorbed on the surface of the first coating anymore. The extra amount of second material is purged from the reaction chamber by using, for example, an inert gas.

As described above, a sequence of operations including introducing the first material, purging, introducing the second material, and purging is repeated predetermined times, and as a result, the lithium oxide Y film containing the element $M^2$ and lithium (second coating) is formed.

Here, the first material and the second material are not particularly limited. Any appropriate compound may be selected depending on the desired oxide Y. Examples of the first material include materials containing phosphorus as the element $M^2$ (e.g., trimethyl phosphate, triethyl phosphate, tris(dimethylamino)phosphine, and trimethylphosphine), materials containing silicon as the element $M^2$ (e.g., tetramethyl orthosilicate and tetraethyl orthosilicate), materials containing the element $M^2$ and lithium (e.g., lithium bis(trimethylsilyl)amide), and materials serving as lithium supply sources (e.g., lithium tertiary butoxide and cyclopentadienyl lithium).

When the first material contains a material containing the element $M^2$, the second material contains a material serving as a lithium supply source (or a material containing the element M and lithium). When the first material contains a material serving as a lithium supply source, the second material contains a material containing the element $M^2$ (or a material containing both the element $M^2$ and lithium). When the first material contains the element $M^2$ and lithium, the second material may be an oxidant (e.g., oxygen or ozone).

To promote reactions of the materials, an oxidant may be introduced into the reaction chamber at a certain time to be used with the materials. An oxidant may be introduced at any time while a sequence of operations is repeated or every time a sequence of operations is repeated.

Three or more materials may be used. In other words, one or more materials may be used in addition to the first material and the second material. For example, a sequence of operations including introducing the first material, purging, introducing the second material, purging, introducing a third material that differs from the first and second materials, and purging may be repeatedly performed.

Hereinafter, with reference to an exemplary prismatic wound-type battery, each component other than the positive electrode will be described in detail. The type and shape, for example, of secondary batteries are not particularly limited.

Figure 1:
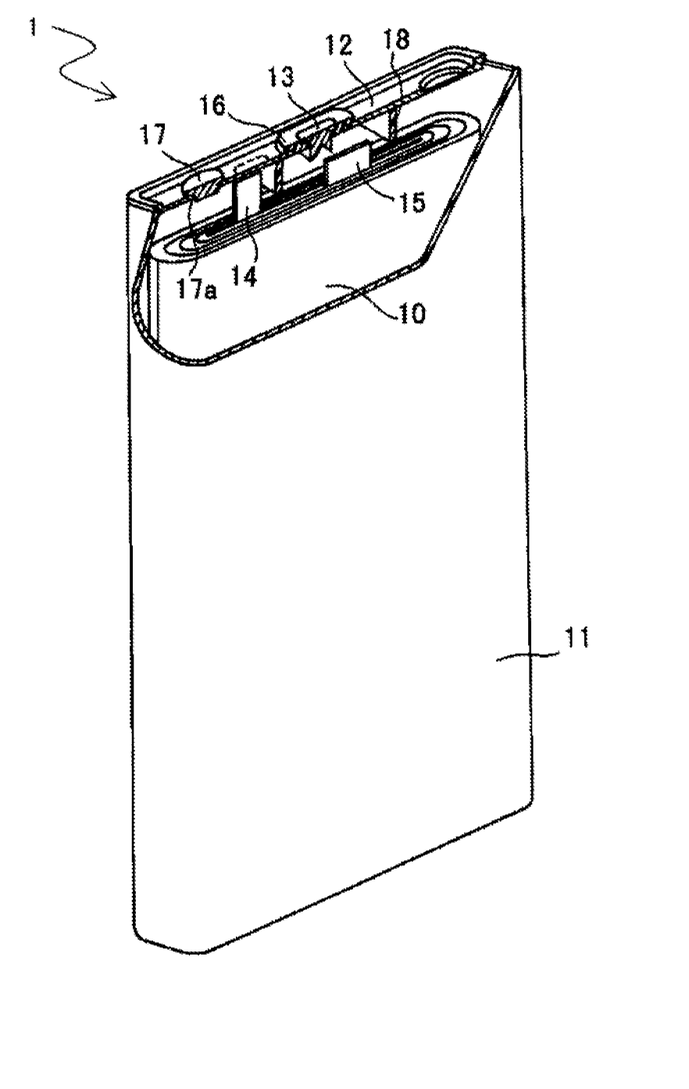
FIG. 1 is a perspective view of a partially notched secondary battery according to an embodiment of the present disclosure.

FIG. 1 is a schematic perspective view of a prismatic secondary battery according to an embodiment of the present disclosure. In FIG. 1, a secondary battery 1 is partially notched to illustrate main parts thereof. In a prismatic battery case 11, a flat wound-type electrode group 10 and an electrolyte (not shown) are accommodated.

To the positive electrode current collector of the positive electrode in the electrode group 10, an end portion of a positive electrode lead 14 is connected. The other end portion of the positive electrode lead 14 is connected to a sealing plate 12, which functions as the positive electrode terminal. To the negative electrode current collector, an end portion of a negative electrode lead 15 is connected. The other end portion of the negative electrode lead 15 is connected to a negative electrode terminal 13 disposed at about the center of the sealing plate 12. A gasket 16 is disposed between the sealing plate 12 and the negative electrode terminal 13 to insulate the sealing plate 12 and the negative electrode terminal 13 from each other. A frame body 18, which is formed of an insulating material, is disposed between the sealing plate 12 and the electrode group 10 to insulate the negative electrode lead 15 and the sealing plate 12 from each other. The sealing plate 12 is bonded to the end portion of the opening of the prismatic battery case 11 and seals the prismatic battery case 11. An inflow hole 17a is formed in the sealing plate 12. An electrolyte is poured into the prismatic battery case 11 through the inflow hole 17a. Thereafter, the inflow hole 17a is closed with a sealing plug 17.

(Negative Electrode)

A sheet-shape negative electrode includes a sheet-shape negative electrode current collector and a negative electrode active material layer disposed on the surface of the negative electrode current collector. The negative electrode active material layer may be formed on one surface or both surfaces of the negative electrode current collector.

(Negative Electrode Current Collector)

Examples of the negative electrode current collector include metal foils, metal sheets, mesh, punched sheets, and expanded metal. The material of the negative electrode current collector may be stainless steel, nickel, copper, or a copper alloy. The thickness of the negative electrode current collector may be selected from the range of, for example, 3 to 50 µm.

(Negative Electrode Active Material Layer)

The negative electrode active material layer may be produced by using a negative electrode slurry containing a negative electrode active material, a binder (binding agent), and a dispersion medium, in accordance with a method for producing the positive electrode active material layer. It is not necessary to cover the negative electrode active material with the first and second coatings. The negative electrode active material layer may optionally contain a constituent, such as an electrically conductive agent. The amount of binder in the negative electrode active material layer relative to 100 parts by mass of the negative electrode active material is preferably 0.1 to 20 parts by mass and more preferably 1 to 5 parts by mass. The negative electrode active material layer may have a thickness of 10 to 100 µm.

The negative electrode active material may be a non-carbon material, a carbon material, or a combination thereof. The carbon material typically binds or releases lithium ions at a potential of 1 V or less with respect to metal lithium. In such a potential region, reductive decomposition of a constituent of the electrolyte is likely to progress on the surface of the carbon material, and a solid electrolyte interphase (SEI) is likely to be generated. However, as described later, the surface of the negative electrode active material layer is covered with a third coating having lithium-ion permeability, and thus, a contact between the carbon material and the electrolyte is suppressed and generation of SEI can be suppressed.

The carbon material used as the negative electrode active material is not particularly limited and is preferably at least one selected from a group consisting of graphite and hard carbon. Graphite promotes reductive decomposition of an electrolyte. Thus, a significant effect is exhibited when a third coating covers the surface of the negative electrode active material layer.

Graphite is a generic name of carbon materials having a graphite structure and includes, for example, natural graphite, artificial graphite, expandable graphite, and graphitized mesophase carbon particles.

A non-carbon material used as the negative electrode active material is preferably an alloy-based material. The alloy-based material preferably contains silicon or tin. Among the alloy-based materials, silicon alone or a silicon compound is preferable. Examples of the silicon compound include silicon oxides and silicon alloys.

At least a portion of the surface of the negative electrode active material layer may be covered with the third coating having lithium-ion permeability. The third coating may be formed after the negative electrode active material layer is formed. In such a case, the third coating can partially cover the surface of the negative electrode current collector in addition to the surface of the negative electrode active material layer.

The material contained in the third coating may be the same as the oxide Y contained in the second coating. In other words, the third coating may be an oxide having lithium-ion permeability represented by the composition formula $Li_xM^2O_y$ ($0.5 \leq x < 4$, $1 \leq y < 6$), $M^2$ being at least one selected from a group consisting of B, Al, Si, P, S, Ti, V, Zr, Nb, Ta, and La. The element $M^2$ in the oxide Y in the third coating may be the same as the element $M^2$ in the second coating or may contain another element. A method for producing the third coating may be the same as the method for producing the second coating.

(Separator)

The separator may be a resin microporous film, nonwoven fabric, or woven fabric. The resin may be polyolefin, such as polyethylene or polypropylene, polyamide, or polyamide-imide.

(Electrolyte)

The electrolyte contains a solvent and a solute dissolved in the solvent. Various lithium salts may be used as the solute. The concentration of the lithium salt in the electrolyte may be 0.5 to 1.5 mol/L.

The solvent may be a nonaqueous solvent or water. Examples of the nonaqueous solvent include cyclic carbonate esters, such as propylene carbonate (PC) and ethylene carbonate (EC); linear carbonate esters, such as diethyl carbonate (DEC), ethyl methyl carbonate (EMC), and dimethyl carbonate (DMC); and cyclic carboxylic acid esters, such as γ-butyrolactone and γ-valerolactone. Such solvents may be used alone or in a combination of two or more.

Examples of the lithium salt include $LiPF_6$, $LiBF_4$, $LiClO_4$, $LiAsF_6$, $LiCF_3SO_3$, $LiN(SO_2F)_2$, and $LiN(SO_2CF_3)_2$. Such lithium salts may be used alone or in a combination of two or more.

EXAMPLES

Hereinafter, with reference to Examples and Comparative Examples, the present disclosure will be specifically described. The present disclosure is not limited to the following Examples.

Example 1

In accordance with the following procedure, a half cell for evaluation in which the negative electrode was lithium metal was produced.

(1) Production of Positive Electrode

Lithium transition metal oxide containing Li, Ni, Co, and Al ($LiNi_{0.88}Co_{0.09}Al_{0.03}O_2$(NCA), average particle diameter 12 µm) was prepared as the positive electrode material.

The lithium transition metal oxide particles were impregnated with an aqueous solution in which $Li_2WO_4$ was dissolved, and dried to each have a first coating formed thereon. The percentage by mass of $Li_2WO_4$ in the entirety of the positive electrode active material particle and the first coating was 1 mass %.

Next, the positive electrode active material particles having the first coating formed thereon were placed in a predetermined reaction chamber. In accordance with the following procedure, the second coating having lithium-ion permeability was formed on the surface of the first coating.

(i) The first material (trimethyl phosphate), which served as the supply source of the element $M^1$ (phosphorus: P) and oxygen (O), was vaporized and introduced into the reaction chamber, in which the positive electrode material was placed. The atmosphere containing the first material was controlled such that the temperature was 120° C. and the pressure was 260 Pa. After 30 seconds, assuming that the surface of the first coating was covered with the first material monolayer, the extra amount of the first material was purged by using nitrogen gas.

(ii) Next, the second material (lithium (bistrimethylsilyl) amide), which served as the supply source of lithium, was vaporized and introduced into the reaction chamber, in which the positive electrode precursor was placed. The atmosphere containing the second material was controlled such that the temperature was 120° C. and the pressure was 260 Pa. After 30 seconds, assuming that the first material monolayer reacted with the second material, the extra amount of the second material was purged by using nitrogen gas.

(iii) A sequence of operations including introducing the first material, purging, introducing the second material, and purging was repeated 100 times, to form the second coating containing the oxide Y.

The composition of the second coating was analyzed by, for example, XPS and ICP. It was confirmed that lithium phosphate was formed.

From the number of times a sequence of operations is performed in ALD, it is presumed that the second coating has a thickness within the range of 10 to 25 nm.

Thereafter, the positive electrode active material particles covered with the first coating and the second coating, acetylene black (AB) serving as the electrically conductive material, and polyvinylidene fluoride (PVdF) serving as the binder were mixed together at a mass ratio of NCA/AB/PVdF=95:2.5:2.5, and an appropriate amount of N-methyl-2-pyrrolidone (NMP) was further added and stirred to prepare a positive electrode mixture slurry. Next, the obtained positive electrode mixture slurry was applied to one surface of an aluminum foil (positive electrode current collector) and dried. Then, the film of the positive electrode mixture was rolled by using a roller.

Finally, after performing rolling, the positive electrode plate was cut to produce a 2-cm square positive electrode.

(2) Preparation of Electrolyte

To 100 parts by mass of a mixed solution containing EC and EMC at a mass ratio of 1:3, 1 part by mass of vinylene carbonate was added to obtain a nonaqueous solvent. $LiPF_6$ was dissolved in the nonaqueous solvent such that the concentration thereof was 1.0 mol/L, to prepare an electrolyte (nonaqueous electrolyte).

(3) Cell Assembly

A lead on which an insulating film was disposed was connected to each of the above positive electrode and the Li metal counter electrode. The electrodes faced each other such that the electrodes completely superpose each other, with a separator interposed therebetween, to obtain an electrode group. The separator was a polyethylene (PE) microporous film of 0.03 mm thickness.

Next, an Al laminate film (thickness 100 μm) was folded in half. An end portion of the film was closed by heat sealing at 230° C., and the film was formed into a cylindrical shape. The electrode group was inserted into the cylindrical laminate film. Heat sealing was performed such that an end portion of the cylindrical laminate film and the insulating film of the lead met. Next, the electrolyte was poured from a side of the laminate film that was not closed by heat sealing. After the electrolyte was poured, the laminate film was left at rest for 15 minutes under a reduced pressure of 0.06 MPa. Finally, the other end portion of the cylindrical laminate film, from which the electrolyte was poured, was closed by heat sealing, to produce evaluation cell A1.

[Evaluation 1]

The evaluation cell A1 was charged at a current of 0.05 C until the voltage reached 4.3 V. Thereafter, the battery was discharged at 0.2 C until the voltage reached 2.5 V, and discharging was stopped. Then, the battery was further discharged at 0.05 C until the voltage reached 2.5 V. The discharge capacity at 0.2 C discharge is denoted as C1, and the discharge capacity at 0.05 C discharge is denoted as C2. The ratio of discharge capacity at 0.2 C to the total discharge capacity, $R=C1/(C1+C2)$, is defined as the output characteristic.

[Evaluation 2]

The evaluation cell A1 was charged at a current of 0.05 C until the voltage reached 4.3 V. Thereafter, a storage test was performed at 60° C. for five days. Before and after the storage test, the amount of decrease in open circuit voltage (OCV) was measured, and a storage characteristic was evaluated.

Comparative Example 1

A positive electrode was produced in the same manner as that in Example 1, except that the treatment for forming the first coating on the positive electrode material and the treatment for forming the second coating were not performed. Evaluation cell B1 was produced by using the produced positive electrode and was evaluated in the same manner as the evaluation cell in Example 1.

Comparative Example 2

A positive electrode was produced in the same manner as that in Example 1, except that the treatment for forming the first coating on the positive electrode material was not performed and that the treatment for forming the second coating directly on the surface of the positive electrode material was performed. Evaluation cell B2 was produced by using the produced positive electrode and was evaluated in the same manner as the evaluation cell in Example 1.

Evaluation results of Example 1 and Comparative Examples 1 and 2 are summarized in Table 1.

TABLE 1

| Cell | First coating (W oxide) | Second coating (LPO) | Output characteristic R | Loss in voltage after charging and storing (mV) |
|---|---|---|---|---|
| A1 | present | present | 97.3 | 50.3 |
| B1 | absent | absent | 96.6 | 55.5 |
| B2 | absent | present | 95.5 | 48.0 |

When the cell B1, in which the second coating was not formed, and the cell B2, in which the second coating was formed, are compared with each other, a loss in voltage of the cell B2 after the cell B2 was charged and stored is more improved than a loss in voltage of the cell B1 after the cell B1 was charged and stored. As described in the related art, it is presumed that the second coating formed suppressed the side reaction on the positive-electrode side.

On the other hand, the output characteristic of the cell B2, in which the second coating was formed, is decreased more than that of the cell B1, in which the second coating was not formed. It is presumed that the second coating formed prevented or reduced the transfer of lithium ions, thereby increasing the internal resistance of the battery.

When the cell A1, in which the second coating was formed, and the cell B1, in which the second coating was not formed, are compared with each other, a loss in voltage of the cell A1 after the cell A1 was charged and stored is more improved than a loss in voltage of the cell B1 after the cell B1 was charged and stored. It is presumed that the second coating formed suppressed the side reaction on the positive-electrode side.

In both of the cell A1 and the cell B2, the second coating was formed. The output characteristic of the cell A1, in which the first coating was formed, is more improved than that of the cell B2, in which the first coating was not formed. The output characteristic of the cell A1 is more improved than that of the cell B1, in which neither the first coating nor the second coating was formed.

It is presumed that the first coating was formed between the second coating and the positive electrode active material particle in the cell A1 and that the first coating improved the stability of the crystallinity of the positive electrode active material surface. This and the effect of the second coating suppressing the side reaction on the positive-electrode side synergistically improved the output characteristic of the cell A1 more than that of the cell B1.

INDUSTRIAL APPLICABILITY

The positive electrode according to the present disclosure is useful as a positive electrode of a secondary battery used as a drive power source of, for example, personal computers, mobile phones, mobile devices, personal digital assistants (PDA), mobile game devices, and video cameras; a main power source or an auxiliary power source for an electric motor drive of hybrid electric vehicles and plug-in HEVs; and a drive power source of, for example, electric power tools, vacuum cleaners, and robots.

REFERENCE SIGNS LIST 1 secondary battery
10 wound-type electrode group
11 prismatic battery case
12 sealing plate
13 negative electrode terminal
14 positive electrode lead
15 negative electrode lead
16 gasket
17 sealing plug
17a inflow hole
18 frame body

The invention claimed is:

1. A secondary battery comprising:
a positive electrode including a positive electrode current collector and a positive electrode active material layer that contains a positive electrode material and that is disposed on a surface of the positive electrode current collector,
wherein the positive electrode material includes
a positive electrode active material particle,
a first coating that contains oxide X of metal element $M^1$ and that is attached to a surface of the positive electrode active material particle, and
a second coating having lithium-ion permeability that is attached to a surface of the first coating,
the second coating contains oxide Y represented by $Li_xM^2O_y$ ($0.5 \leq x < 4$, $1 \leq y < 6$), $M^2$ being at least one selected from a group consisting of B, Al, Si, P, S, Ti, V, Zr, Nb, Ta, and La;
a negative electrode including a negative electrode current collector, a negative electrode active material layer disposed on a surface of the negative electrode current collector, and a third coating having lithium-ion permeability,
the third coating contains the oxide Y and covers at least a portion of a surface of the negative electrode active material layer; and,
an electrolyte having lithium-ion conductivity.

2. The secondary battery, according to claim 1, wherein the metal element $M^1$ contains at least one selected from the group consisting of W, Mg, and Ti.

3. The secondary battery, according to claim 1, wherein, in the positive electrode active material particle to which the first coating and the second coating are attached, the metal element $M^1$ has a concentration distribution in a depth direction such that the metal element $M^1$ localizes close to the first coating more than in an inner portion of the positive electrode active material particle.

4. The secondary battery according to claim 3, wherein the metal element $M^1$ differs from the $M^2$,
in the positive electrode active material particle to which the first coating and the second coating are attached,
the $M^2$ has a concentration distribution in a depth direction is such that the $M^2$ localizes in the second coating more than in the inner portion of the positive electrode active material particle, and
$N_X$ and $N_Y$ satisfy $N_X/N_Y \leq 5$, $N_X$ being a number of the metal element $M_1$ contained in an entirety of the positive electrode active material particle, the first coating, and the second coating, $N_Y$ being a number of the $M^2$ contained in the entirety of the positive electrode active material particle, the first coating, and the second coating.

5. The secondary battery, according to claim 1, wherein the second coating partially covers a surface of the positive electrode current collector.

6. The secondary battery, according to claim 5, wherein the positive electrode active material layer contains a binder, and
the second coating partially covers a surface of the binder.

7. The secondary battery, according to claim 6, wherein a region in which the second coating is not disposed is present on an adhesion interface between positive electrode active material particles and the binder.

8. A positive electrode for a secondary battery comprising a positive electrode current collector and a positive electrode active material layer that contains a positive electrode material and that is disposed on a surface of the positive electrode current collector,
wherein the positive electrode material includes
a positive electrode active material particle,
a first coating that contains oxide X of metal element $M^1$ and that is attached to a surface of the positive electrode active material particle, and
a second coating having lithium-ion permeability that is attached to a surface of the first coating, and
the second coating contains oxide Y, wherein the oxide Y is at least one selected from the group consisting of $Li_xPO_y$ ($1 \leq x < 3$, $3 \leq y < 4$) and $Li_xSiO_y$ ($2 \leq x < 4$, $3 \leq y < 4$).

9. The secondary battery, according to claim 1, wherein the positive electrode active material particle contains $Li_aNi_bM^3{}_{1-b}O_2$ ($0 < a \leq 1.2$, $0.8 \leq b \leq 1$), and
$M^3$ is at least one selected from a group consisting of Mn, Co, and Al.

10. The secondary battery, according to claim 1, wherein the second coating contains nitrogen.

11. A method for producing a secondary battery, the method comprising:
a step of forming a positive electrode, including:
a step of preparing a positive electrode active material particle;
a step of attaching oxide X of metal element $M^1$ to a surface of the positive electrode active material particle to form a first coating;
a step of disposing a positive electrode active material layer containing the positive electrode active material particle on a positive electrode current collector; and a step of covering at least a portion of a surface of the first coating by using a second coating having lithium-ion permeability, wherein the second coating is formed by exposing the positive electrode active material layer or the positive electrode active material particle having the first coating formed thereon to an atmosphere containing a material of the second coating;

the second coating contains oxide Y represented by $Li_xM^2O_y$ ($0.5 \leq x < 4$, $1 \leq y < 6$), $M^2$ being at least one selected from a group consisting of B, Al, Si, P, S, Ti, V, Zr, Nb, Ta, and La;

a step of forming a negative electrode, including:

a step of preparing a negative electrode current collector;

a step of preparing a negative electrode active material layer disposed on a surface of the negative electrode current collector;

a step of preparing a third coating having lithium-ion permeability on the negative electrode current collector;

the third coating contains the oxide Y and covers at least a portion of a surface of the negative electrode active material layer; and, a step of combining the positive electrode, the negative electrode and an electrolyte having lithium-ion conductivity within a battery case.

12. The method for producing the secondary battery, according to claim 11, wherein the second coating is formed by atomic layer deposition.

* * * * *